United States Patent
Sano et al.

(10) Patent No.: US 12,430,147 B2
(45) Date of Patent: Sep. 30, 2025

(54) HYPERPARAMETER TUNING METHOD, PROGRAM TRIAL SYSTEM, AND COMPUTER PROGRAM

(71) Applicant: Preferred Networks, Inc., Tokyo (JP)

(72) Inventors: Shotaro Sano, Tokyo (JP); Toshihiko Yanase, Tokyo (JP); Takeru Ohta, Tokyo (JP); Takuya Akiba, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 354 days.

(21) Appl. No.: 17/643,661

(22) Filed: Dec. 10, 2021

(65) Prior Publication Data

US 2022/0100531 A1    Mar. 31, 2022

Related U.S. Application Data

(63) Continuation of application No. PCT/JP2020/022428, filed on Jun. 5, 2020.

(30) Foreign Application Priority Data

Jun. 12, 2019  (JP) .................. 2019-109537

(51) Int. Cl.
*G06F 9/44* (2018.01)
*G06F 9/448* (2018.01)
*G06N 20/00* (2019.01)

(52) U.S. Cl.
CPC ........... *G06F 9/4494* (2018.02); *G06N 20/00* (2019.01)

(58) Field of Classification Search
CPC .................................................... G06F 9/4494

USPC ......................................................... 719/320
See application file for complete search history.

(56) References Cited

U.S. PATENT DOCUMENTS

| | | | |
|---|---|---|---|
| 10,565,498 B1 * | 2/2020 | Zhiyanov | G06N 3/045 |
| 2018/0336493 A1 * | 11/2018 | Hayes | G06N 7/01 |
| 2019/0156229 A1 * | 5/2019 | Tee | G06N 7/00 |
| 2019/0236487 A1 * | 8/2019 | Huang | G06N 20/00 |
| 2020/0097853 A1 * | 3/2020 | Golovin | G06N 5/01 |
| 2021/0224692 A1 | 7/2021 | Akiba | |

FOREIGN PATENT DOCUMENTS

JP    2013-242604    12/2013

OTHER PUBLICATIONS

Jérémy Rapin, Add a Nevergrad Sweeper plugin (#430), Mar. 11, 2020 (JST), <https://github.com/facebookresearch/hydra/commit/0bfb4f44fd6d526f121632a1a31ff14ad8663289>.

(Continued)

*Primary Examiner* — Timothy A Mudrick
(74) *Attorney, Agent, or Firm* — IPUSA, PLLC

(57) ABSTRACT

A hyperparameter configuration device includes at least one memory, and at least one processor configured to acquire a program execution instruction including parameter description data, the program execution instruction being written through a command-line interface, set a value of a hyperparameter of a program to be trialed, based on the parameter description data, acquire a result of a trial of the program, the trial of the program being executed with the value of the hyperparameter, and set a next value of the hyperparameter of the program, based on the result of the trial.

28 Claims, 8 Drawing Sheets

(56) References Cited

OTHER PUBLICATIONS

Jérémy Rapin et al., Add a Nevergrad Sweeper plugin #430, Feb. 21, 2020( JST) to Mar. 11, 2020 (JST), <https://github.com/facebookresearch/hydra/pull/430#issue-568483145>.
Rishav1 et al., Suggested design changes for version 0.10. Issue#368, May 24, 2019 version, <https://github.com/pfnet/pptuna/issues/368#issue-426985605>.
The easiest way to run, track, and compare machine learning experiments, May 24, 2019 version, <https://guild.ai/>.
Hyperparameter Search, May 24, 2019 version, <https://docs.snark.ai/use-cases/hyperparameter.html>.
GitHub—Epistimio/orion: Asynchronous Distributed Hyperparameter Optimization., May 24, 2019 version, <https://github.com/Epistimio/orion>.
Simple example—orion v0.1.2.post0 documentation, May 24, 2019 version, <https://orion.readthedocs.io/en/latest/user/bytorch.html#adapting-the-code-of-mnist-example>.
GitHub—sseemayer/ParOpt: Generic command-line parameter optimization, May 24, 2019 version, <https://github.com/sseemayer/ParOpt>.
Takuya Akiba, Optuna: An Automatic Hyperparameter Optimization Framework, Preferred Networks Research & Development Blog [online], Dec. 3, 2018, Internet:<URL:https://tech.preferred.jp.ja/blog/optuna-release/>, [retrieval date Jul. 15, 2020], in particular, "What is Optuna?", "What is its relationship with Chainer?", "Pruning of trials using learning curve".
@Koshian2, GridSearchCV is already old!, Support vector machines are also easily tuned with Optuna., Qiita [online], May 13, 2019, Internet:<URL:https://qiita.com/koshian2/items/1c0f781d244a6046b83e>, [retrieval date Jul. 15, 2020], In particular, "creating an objective function", non-official translation ("GridSearchCV is already old!, Support vector machines are also easily tuned with Optuna").
Takuya Akiba et al., "Optuna: A Next-generation Hyperparameter Optimization Framework", KDD 2019 Applied Data Science track [online], Jul. 26, 2019, Internet:<URL:https://arxiv.org/abs/1907.10902>, [retrieval date Jul. 15, 2020] , sections2, 3.

* cited by examiner

FIG.2

```
optunash run -n 100 -- ¥ nn-train ¥

-- learning_rate={{uniform,0.01,0.1}} ¥

-- num_layers={{int,2,8}} nn-train --learning_rate=0.02 --num_layers=3 nn-train --learning_rate=0.07 --num_layers=6

```
optunash run -n 10 -- ¥
    nn-train ¥
    -- n_layers={{int,1,8}} ¥
    -- n_hidden={{int,1,1024/n_layers}} nn-train --n_layers=2 --n_hidden=16 nn-train --n_layers=7 --n_hidden=25

...
```

```
optunash run -n 50 --storage sqlite:///foo.db --study-
name total-100 -- ¥
    "lightgbm config=goss.conf ¥
    top_rate={{uniform,top_rate,0,1}} ¥
    other_rate={{uniform,other_rate,0,1-top_rate}}"

optunash run -n 50 --storage sqlite:///foo.db --study-
name total-100 -- ¥
    "lightgbm config=goss.conf ¥
    top_rate={{uniform,top_rate,0,1}} ¥
    other_rate={{uniform,other_rate,0,1-top_rate}}"
```

FIG.7

HYPERPARAMETER TUNING METHOD, PROGRAM TRIAL SYSTEM, AND COMPUTER PROGRAM

CROSS-REFERENCE TO RELATED APPLICATIONS

This application is a continuation application of International Application No. PCT/JP2020/022428 filed on Jun. 5, 2020, and designating the U.S., which is based upon and claims priority to Japanese Patent Application No. 2019-109537, filed on Jun. 12, 2019, the entire contents of which are incorporated herein by reference.

BACKGROUND

1. Technical Field

The present disclosure relates to a hyperparameter tuning method, a program trial system, and a computer program.

2. Description of the Related Art

In training a machine learning model, adjustments to hyperparameters, such as a learning rate, the batch size, the number of learning iterations, the number of layers of a neural network, and the number of channels of a neural network, are required. Specifically, various hyperparameter values are set, and a machine learning model is trained under the set hyperparameter values.

However, while the adjustments of the hyperparameters affect the accuracy of a trained deep learning model, the hyperparameters of the deep learning model are currently either manually adjusted by a user or adjusted by executing a hyperparameter configuration program written by a user using a specific programming language such as Python. Additionally, a conventional hyperparameter configuration program (for example, Orion) is not necessarily convenient, because it is necessary to directly write code in a target program (a machine learning model) for which the hyperparameter is to be set, for example.

SUMMARY

According to one aspect of the present disclosure, a hyperparameter configuration device includes at least one memory, and at least one processor configured to acquire a program execution instruction including parameter description data, the program execution instruction being written through a command-line interface, set a value of a hyperparameter of a program to be trialed, based on the parameter description data, acquire a result of a trial of the program, the trial of the program being executed with the value of the hyperparameter, and set a next value of the hyperparameter of the program, based on the result of the trial.

BRIEF DESCRIPTION OF THE DRAWINGS

FIG. 2 is a drawing illustrating parameter description data that is an example according to the embodiment of the present disclosure;

FIG. 4 is a drawing illustrating parameter description data that is an example according to another embodiment of the present disclosure;

FIG. 7 is a drawing illustrating parameter description data that is an example according to still another embodiment of the present disclosure.

DETAILED DESCRIPTION

In the following, embodiments of the present disclosure will be described with reference to the drawings. In the following embodiments, a hyperparameter configuration device for a trial target model, such as a deep learning model, is disclosed.

Outline of the Present Disclosure

The outline of the present disclosure is that, in response to a user inputting a program execution instruction including parameter description data for setting a hyperparameter for a user program to be trialed, to a command-line interface, such as a command prompt, console, or the like that is displayed on a user terminal, the hyperparameter configuration device sets a value of the hyperparameter in the user program according to the input parameter description data. According to the present disclosure, the user transmits the program execution instruction including the parameter description data of the hyperparameter from the command-line interface. The hyperparameter configuration device sets the value of the hyperparameter of the user program based on the program execution instruction including the acquired parameter description data. This allows a user to search the hyperparameter without writing a program or a file in the user program for setting the hyperparameter. Additionally, for example, this allows a user to search a hyperparameter suitable for the written user program to be trialed regardless of the type of a programming language.

Here, in the present specification, the hyperparameter refers to a parameter that controls a behavior of a machine learning algorithm. In particular, if the machine learning model is a deep learning model, the hyperparameter refers to a parameter that cannot be optimized by a gradient method, such as a learning rate, the batch size, and the number of learning iterations. Additionally, the hyperparameter tuning includes, in addition to an evaluation of a value of the hyperparameter, an improvement (selecting a more preferable value) and optimization. Here, the evaluation of the value of the hyperparameter indicates that a user program is executed using the value of the hyperparameter and an evaluation value is acquired.

Example of the Hyperparameter Configuration Device

Figure 1:
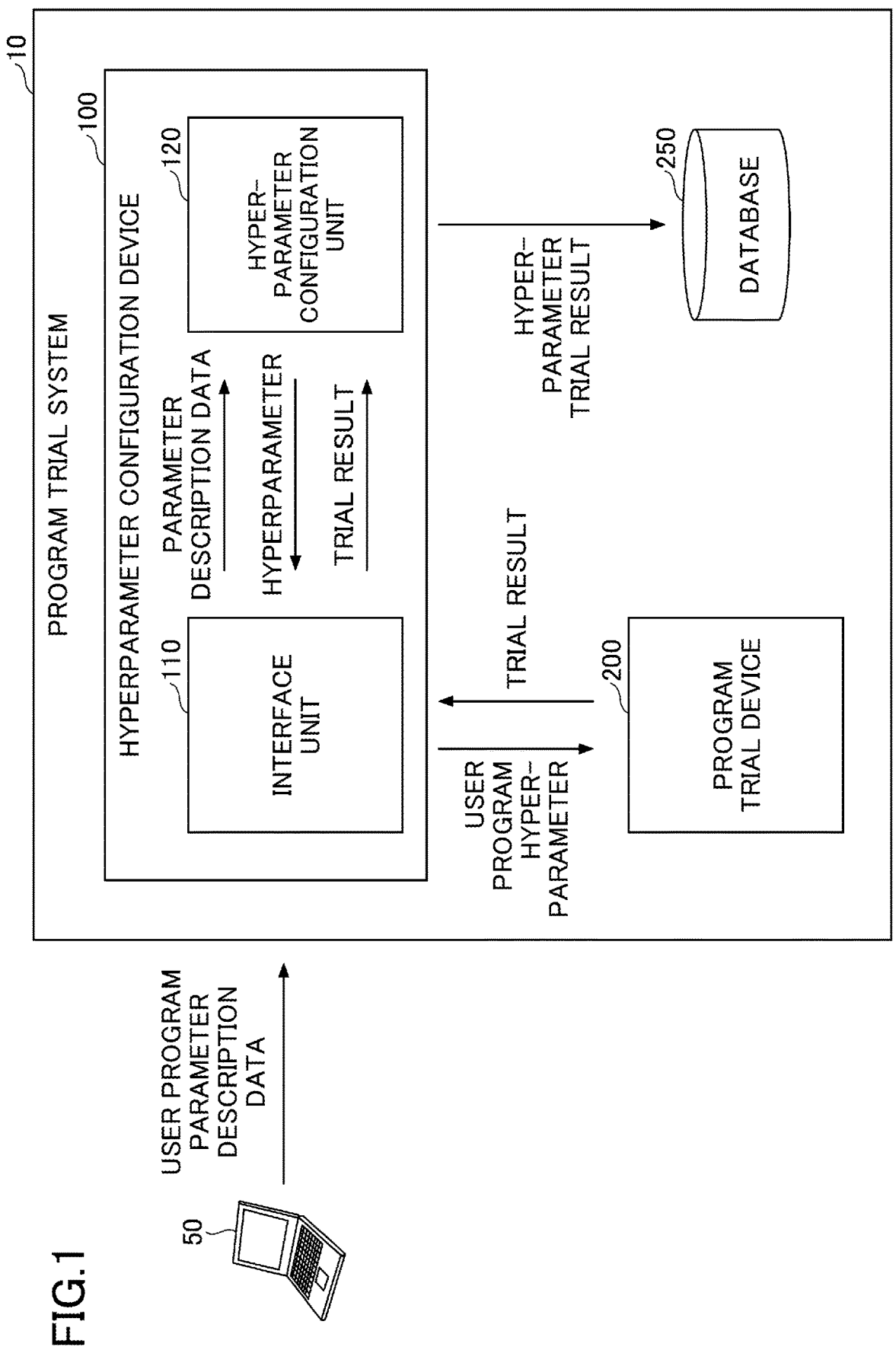
FIG. 1 is a schematic diagram illustrating a hyperparameter configuration device according to an embodiment of the present disclosure.

First, a hyperparameter configuration device according to an embodiment of the present disclosure will be described with reference to FIGS. 1 to 3. FIG. 1 is a schematic diagram illustrating the hyperparameter configuration device according to the embodiment of the present disclosure.

As illustrated in FIG. 1, a program trial system 10 includes a hyperparameter configuration device 100, a program trial device 200, and a database 250, and is connected to a user terminal 50. When the program trial system 10 acquires, for example, parameter description data together with a user program to be trialed (for example, a deep learning model) from the user terminal 50, the program trial system 10 determines and sets a value of the hyperparameter for trialing the user program in accordance with the acquired parameter description data and the program execution instruction, and trials the user program based on the determined value of the hyperparameter. After trialing the user program under the determined value of the hyperparameter, the program trial system 10 determines a next value of the hyperparameter based on a result of the trial and repeats the trial until a termination condition is satisfied. Upon satisfying a predetermined termination condition, such as the completion of a user-specified number of trials, the program trial system 10 determines an optimum value of the hyperparameter for the user program based on a result of the trials performed by using various values of the hyperparameter. For example, if the user program is a deep learning model, a deep learning model trained by an optimum value of the hyperparameter is used for subsequent classification, prediction, and the like. Here, in the present specification, the term "optimize" refers to approaching an optimum state, and is not limited to precisely approaching the optimum value or state. Similarly, "optimum" is not limited to strictly being optimum.

In the illustrated embodiment, the program trial system 10 includes three physically separate devices that are the hyperparameter configuration device 100, the program trial device 200, and a database 250, but the program trial system 10 in the present disclosure is not limited to this and may be implemented by a single device that achieves functions provided by the hyperparameter configuration device 100, the program trial device 200, and the database 250. Additionally, the program trial system 10 in the present disclosure may be implemented by one or more processors and one or more memories.

The user terminal 50 is, for example, a computing device, such as a personal computer, a tablet, or the like. A user creates and stores a user program in which a trial target model, such as a machine learning model or a deep learning model to be trained is written, by using the user terminal 50, and also transmits the user program to the hyperparameter configuration device 100 of the program trial system 10, for example.

The user terminal 50 also provides the hyperparameter configuration device 100 with a program execution instruction including parameter description data for specifying a hyperparameter to be set in the user program. Specifically, the user inputs a command line for starting the hyperparameter configuration device 100 on a command-line interface, such as a command prompt or a console, displayed on the user terminal 50, and inputs a program execution instruction including the parameter description data for setting various hyperparameters as an option of the command.

For example, as illustrated in FIG. 2, the user first starts the hyperparameter configuration device 100, inputs "optunash run-n 100--" at the command-line interface on the user terminal 50, and specifies the execution of a hyperparameter configuration program (in the example of FIG. 2, "optunash") and the number of trials performed by the execution for the user program as 100. Additionally, the user inputs the program execution instruction including the parameter description data.

For example, the user first inputs the user program "nn-train" to be trialed. Then, the user specifies, for example, the learning rate "--learning_rate" and the number of layers "--num_layers" as the parameter descriptive data. Specifically, the parameter description data may define a setting range of the hyperparameter with a distribution identifier and a range specification value.

Here, the user inputs "--learning_rate={{uniform, 0.01, 0.1}}" as an option of the command as the learning rate. According to the "--learning_rate={uniform, 0.01, 0.1}}", "uniform" is a distribution identifier indicating a uniform distribution, the range specification values "0.01" and "0.1" indicate a setting range from "0.01" to "0.1", and the "--learning_rate={{uniform, 0.01, 0.1}" specifies that the learning rate is selected with a uniform distribution in the setting range from "0.01" to "0.1".

The user also inputs "- - - num_layers={int, 2, 8}" as the number of layers. According to "- - - num_layers={int, 2, 8}", "int" is a distribution identifier indicating that a selection target is only an integer, the range specification values "2" and "8" indicate a setting range from "2" to "8", and "- - - num_layers={{int, 2, 8}" specifies that the number of layers is selected in the setting range from "2" to "8".

Here, the distribution identifier is not limited to these. For example, the distribution identifier "loguniform" indicating a logarithmic uniform distribution, the distribution identifier "discrete_uniform" indicating a uniform distribution selected by a specified quantization step, the distribution identifier "categorical" indicating an element to be selected, or the like may be used.

In this way, the parameter description data defining the setting range of the hyperparameter with the distribution identifier and the range specification value is input through the command-line interface on the user terminal 50, and is transmitted to the hyperparameter configuration device 100 by, for example, pressing a return key.

The hyperparameter configuration device 100 includes an interface unit 110 and a hyperparameter configuration unit 120. The hyper parameter setting unit 120 is an example of a hyperparameter processor.

The interface unit 110 acquires the program execution instruction including the parameter description data for setting the hyperparameter of the program that is described in the command-line interface. As illustrated in FIG. 1, for example, the program execution instruction including the user program and the parameter description data transmitted from the user terminal 50 to the hyperparameter configuration device 100 is received at the interface unit 110. The interface unit 110 passes the received program execution instruction including the user program and the parameter description data to the program trial device 200 and the hyperparameter configuration unit 120.

For example, when the interface unit 110 acquires the program execution instruction including the parameter description data of various hyperparameters that is input to the command-line interface on the user terminal 50, the interface unit 110 converts the parameter description data in the acquired program execution instruction into a data format that can be processed by the hyperparameter configuration unit 120 and passes the converted parameter description data to the hyperparameter configuration unit 120.

Specifically, the interface unit 110 parses the acquired program execution instruction including the parameter description data and extracts a specific pattern portion such as "{{string}}". In the specific example of the parameter description data illustrated in FIG. 2, the interface unit 110 first detects "--learning_rate={{uniform, 0.01, 0.1}}" as the specific pattern portion from the acquired parameter description data, and then the interface unit 110 uses the first item "uniform" as the distribution identifier and extracts the second and third items that are "0.01" and "0.1" as the range specification values. After extracting the specific pattern portion, the interface unit 110 specifies a parameter request corresponding to the extracted distribution identifier by referring to a correspondence table or the like that is retained in advance and sets the extracted range specification values in the specified parameter request as arguments.

Here, a case in which the hyperparameter tuning software Optuna is used in the hyperparameter configuration unit 120 will be described as an example. The interface unit 110 may convert "--learning_rate={{uniform, 0.01, 0.1}}" to a parameter request "trial.suggest_uniform('learning_rate', 0.01.0.1)" as Suggest API. The interface unit 110 transmits the converted parameter request to the hyperparameter configuration unit 120. Subsequently, the interface unit 110 performs substantially the same processing for "--num_layers={int, 2, 8}".

The hyperparameter configuration unit 120 sets the value of the hyperparameter in the program according to the parameter description data. Specifically, as illustrated in FIG. 1, when the parameter description data is acquired from the interface unit 110, the hyperparameter configuration unit 120 determines the value of the hyperparameter with respect to the user program according to the acquired parameter description data, and returns the determined value of the hyperparameter to the interface unit 110.

For example, the value of the hyperparameter may be selected in accordance with the distribution identifier and the range specification value of the parameter request acquired from the interface unit 110. When the parameter request "trial.suggest_uniform('learning_rate', 0.01.0.1)" as described above is acquired, the hyperparameter configuration unit 120 may randomly set the value of the hyperparameter according to the uniform distribution within the range of "0.01" to "0.1". The values of the hyperparameter may also be set by using Bayesian optimization, Gaussian assumptions, software for hyperparameter optimization, and the like. The hyperparameter configuration unit 120 may also store the set value of the hyperparameter in the database 250.

As described, when the value of the hyperparameter set by the hyperparameter configuration unit 120 is acquired, the interface unit 110 passes the acquired value of the hyperparameter to the program trial device 200 and instructs the program trial device 200 to execute the user program with the value of the hyperparameter. For example, if learning_rate is 0.02 and num_layers is 3, the respective parameter descriptive data is replaced to generate an execution instruction (command) of "nn-train--learning_rate=0.02--num_layers=3" and the execution instruction is executed. Similarly, if learning_rate is 0.07 and num_layers is 6, an execution instruction (command) "nn-train--learning_rate=0.07--num_ layers=6" is generated and executed. After the user program is executed with the specified value of the hyperparameter, the interface unit 110 acquires a trial result from the program trial device 200.

For example, if the user program is a deep learning model to be trained, the interface unit 110 instructs the program trial device 200 to train the deep learning model with the value of the hyperparameter that is set by the hyperparameter configuration unit 120. The program trial device 200, for example, uses training data prepared in advance and the like to train the deep learning model under the specified value of the hyperparameter and returns, to the interface unit 110, a trial result including evaluation values, such as the accuracy, the execution time, and the degree of progress of the trained deep learning model.

The trial result may be acquired as a standard output (stdout) or as a file. The interface unit 110 acquires the evaluation values, such as the accuracy, the execution time, and the degree of progress of the trained learning model, from the trial result acquired as the standard output or the file. For example, if the trial result is acquired as the standard output by using a function that receives an input string and extracts a trial result, the evaluation value may be a value obtained by reading the last line of the input string and then converts the read line to a floating-point value. However, the extraction of the evaluation values is not limited to this, and instead of reading the last line, the evaluation values may be obtained using a pattern match, such as a regular expression. Alternatively, a pattern of the evaluation values may be specified by an argument.

When the trial result is acquired from the program trial device 200, the interface unit 110 passes the acquired trial result to the hyperparameter configuration unit 120. The hyperparameter configuration unit 120 stores the acquired trial result in the database 250 in association with the applied value of the hyperparameter. Subsequently, the hyperparameter configuration unit 120 sets a next value of the hyperparameter according to the uniform distribution within the setting range from "0.01" to "0.1" and transmits the set value to the interface unit 110. The user program is executed in the program trial device 200 by the specified number of trials under the value of the hyperparameter that is set again, as described above.

The program trial device 200 is, for example, a computing device such as a server that executes a user program to be trialed such as a deep learning model. In the illustrated embodiment, the program trial device 200 is illustrated as a computing device separate from the hyperparameter configuration device 100. However, the present disclosure is not limited to this, and the program trial device 200 may be implemented, for example, in the same computing device as the hyperparameter configuration device 100.

The database 250 stores the trial result of the user program to be trialed under the value of the hyperparameter that is set by the hyperparameter configuration unit 120. For example, after executing the user program by a specified number of trials, the user can obtain the trial result including the evaluation values stored in the database 250 and determine the optimal value of the hyperparameter from the trial results obtained by using the values of the various hyperparameters.

Figure 3:
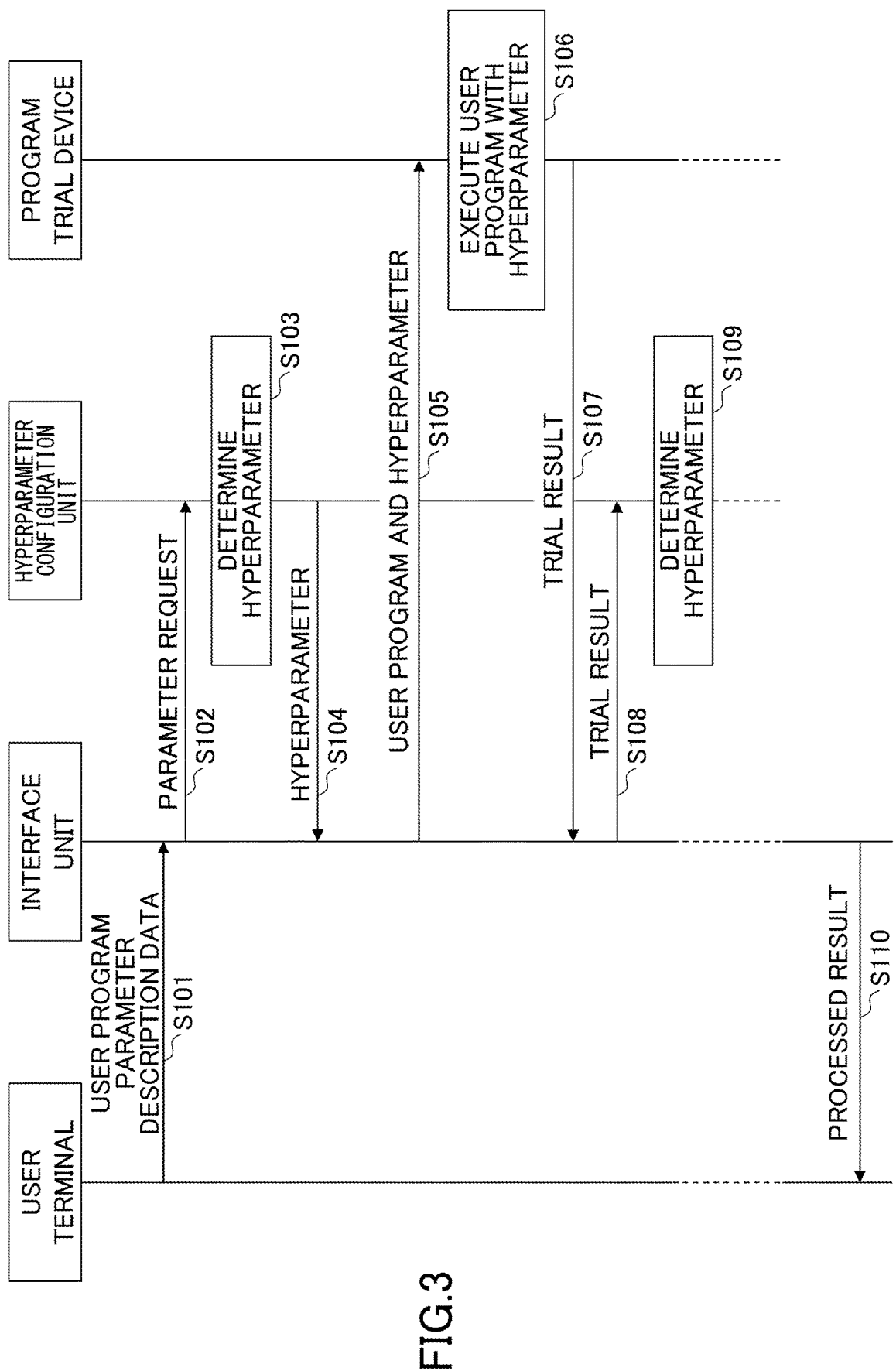
FIG. 3 is a sequence diagram illustrating a hyperparameter configuration process according to the embodiment of the present disclosure.

FIG. 3 is a sequence diagram illustrating a hyperparameter configuration process according to the embodiment of the present disclosure. For example, the hyperparameter configuration process may be initiated by the hyperparameter configuration device 100 starting a hyperparameter configuration application provided to the user terminal 50.

As illustrated in FIG. 3, in step S101, the user terminal 50 provides the interface unit 110 with the user program to be trialed (for example, the deep learning model to be trained or the like) and the program execution instruction including the parameter description data of the hyperparameter applied to the trial of the user program. Specifically, for example, the user uses the user terminal 50 to transmit the user program to be trialed to the hyperparameter configuration device 100 and transmit the program execution instruction including the parameter description data that specifies the hyperparameter used in the trial of the user program through the command-line interface of the user terminal 50, to the hyperparameter configuration device 100.

In step S102, the interface unit 110 generates a parameter request based on the parameter description data acquired from the user terminal 50 and transmits the generated parameter request to the hyperparameter configuration unit 120.

In step S103, the hyperparameter configuration unit 120 determines the value of the hyperparameter for the trial of the user program based on the acquired parameter request. For example, if the acquired parameter request is "trial.suggest_uniform ('learning_rate', 0.01.0.1)", the hyperparameter configuration unit 120 selects a value of the learning rate according to the uniform distribution within the range from "0.01" to "0.1".

In step S104, the hyperparameter configuration unit 120 returns the determined value of the hyperparameter to the interface unit 110.

In step S105, the interface unit 110 generates a program execution instruction in which the parameter description data is replaced by the value of the hyperparameter, transmits the user program to be trialed and the program execution instruction replaced with the set value of the hyperparameter, to the program trial device 200, and instructs the program trial device 200 to trial the user program under the value of the hyperparameter.

In step S106, the program trial device 200 executes the user program under the acquired value of the hyperparameter according to the trial instruction from the interface unit 110. For example, if the user program is a deep learning model, the program trial device 200 trains the deep learning model under the value of the hyperparameter set by the hyperparameter configuration unit 120 and evaluates the accuracy, the execution time, the degree of progress, and the like of the deep learning model trained under the value of the hyperparameter.

In step S107, the program trial device 200 returns the trial result including the evaluation results of the accuracy, the execution time, the degree of progress, and the like to the interface unit 110.

In step S108, the interface unit 110 extracts the evaluation results from the acquired trial result and provides the hyperparameter configuration unit 120 with the extracted evaluation results.

In step S109, the hyperparameter configuration unit 120 stores the acquired trial result in the database 250 and sets the value of the hyperparameter applied to the next trial when the number of trials does not reach a specified number. Steps S104-S109 are then repeated until the number of trials reaches the specified number.

When the number of trials reaches the specified number, in step S110, the interface unit 110 provides the user terminal 50 with the trial result that has been acquired, as a final result.

Another Embodiment of the Hyperparameter Configuration Device

Next, a hyperparameter configuration device according to another embodiment of the present disclosure will be described with reference to FIG. 4. In the embodiment described above, different types of hyperparameter values, such as the learning rate and the number of layers, are determined independently of each other (Define-and-run method), but in this embodiment, the hyperparameter values are set in the Define-by-run method. That is, when multiple types of hyperparameters are set, depending on a value of one hyperparameter that has been already set, a value of another hyperparameter is set.

For example, as illustrated in FIG. 4, the user specifies the number of layers "--n_layers={int, 1, 8}" and the number of hidden_layers "--n_hidden={int, 1, 1024/n_layers}" as the parameter description data through the command-line interface.

Specifically, the user specifies the number of layers based on the distribution identifier "int" and the setting range from "1" to "8". Next, the user specifies the number of hidden_layers based on the distribution identifier "int" and the setting range from "1" to "1024/n_layers". That is, the setting range of the number of hidden_layers is set, depending on a value of the number of layers "n_layers" that has been already set. As described, in accordance with the parameter description data according to the present embodiment, the value of the number of layers "n_layers" is first determined in the order specified in the command-line interface, and a pair of the hyperparameter "n_layers" and the determined value is stored. Then, when determining the setting range of the number of hidden_layers "n_hidden" according to "--n_hidden={int, 1, 1024/n_hidden}", the setting range of the number of hidden_layers "n_hidden" is determined depending on a stored value corresponding to the number of layers "n_layers". For example, in the specific example illustrated in FIG. 4, when "n_layers" is set to "2", a pair of "n_layers" and "2" is stored and is used to determine "n_hidden". When "n_layers" is set to "7", a pair of "n_layers" and "7" is stored and is used to determine "n_hidden". That is, the value of the hyperparameter can be set by a Define-by-run method in which the value of one hyperparameter is set depending on the set value of another hyperparameter.

For example, when n_layers is 2 and n_hidden is 16, the corresponding parameter description data is replaced to generate an execution instruction (command) "nn-train--n_layers=2--n_hidden=16" and the generated execution instruction is executed. Similarly, when n_layers is 7 and n_hidden is 25, an execution instruction (command) "nn-train--n_layers=7--n_hidden=25" is generated and the generated execution instruction is executed.

When the parameter description data for which the value of the hyperparameter is set by such a Define-by-run method is acquired from the user terminal 50, the hyperparameter configuration unit 120 determines and stores the values of the hyperparameters in the order described in the acquired parameter description data, and determines a value of another hyperparameter depending on a value of the hyperparameter that has been already determined and stored.

Still Another Embodiment of the Hyperparameter Configuration Device

Figure 5:
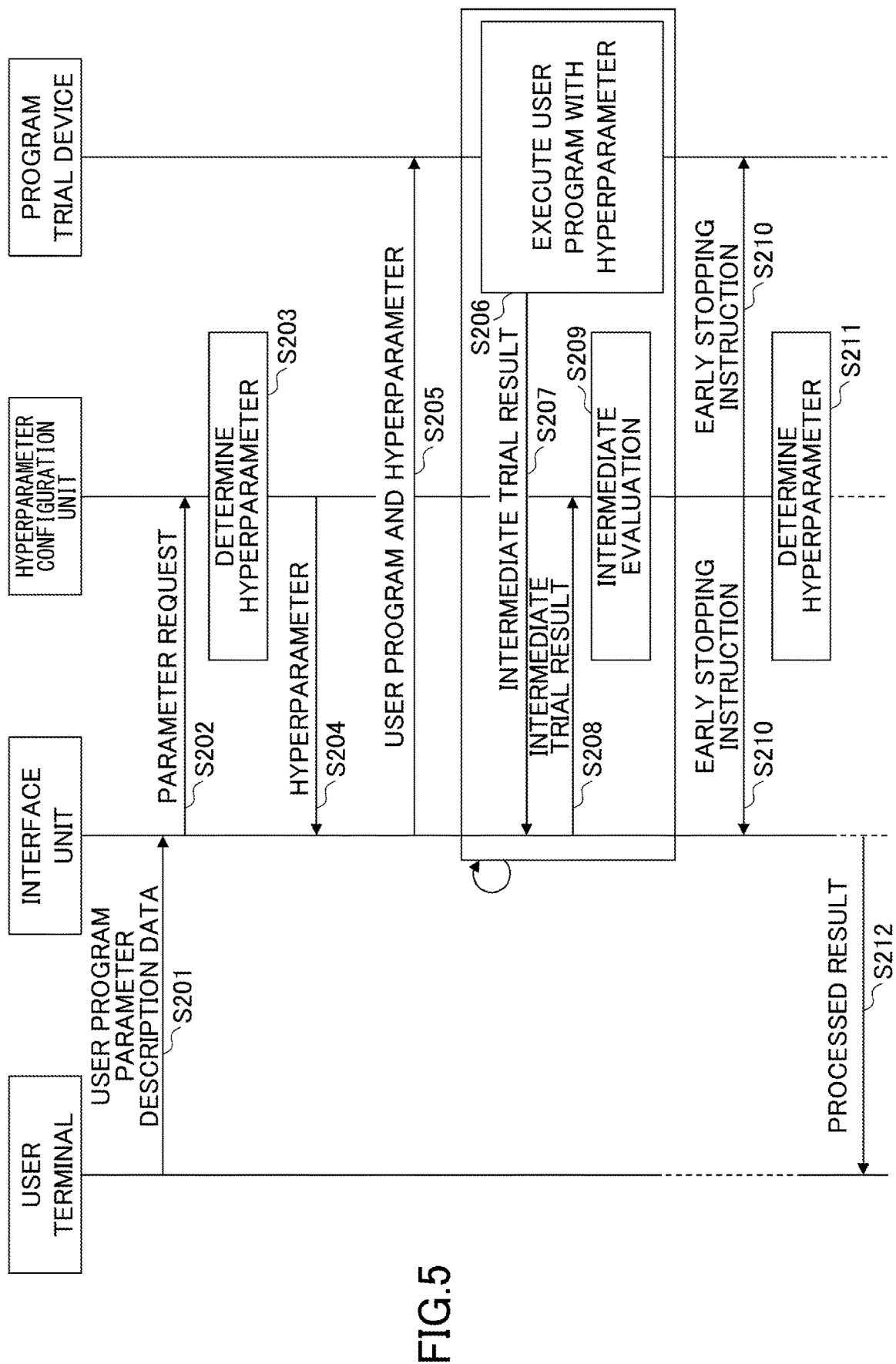
FIG. 5 is a sequence diagram illustrating a hyperparameter configuration process according to another embodiment of the present disclosure.

Next, a hyperparameter configuration device according to still another embodiment of the present disclosure will be described with reference to FIG. 5. In the above-described embodiment, the user program is executed by the number of trials specified by the user. However, in the present embodiment, the training of the user program is terminated early based on an interim evaluation of the trial result. That is, the trial of the user program is terminated based on an intermediate trial result of the user program that is trialed under the set value of the hyperparameter. FIG. 5 is a sequence diagram illustrating a hyperparameter configuration process according to still another embodiment of the present disclosure.

As illustrated in FIG. 5, in step S201, the user terminal 50 provides the interface unit 110 with the user program to be trialed (for example, a deep learning model to be trained or the like) and the parameter description data of the hyperparameter applied to the trial of the user program.

In step S202, the interface unit 110 generates the parameter request based on the parameter description data acquired from the user terminal 50 and transmits the generated parameter request to the hyperparameter configuration unit 120.

In step S203, the hyperparameter configuration unit 120 determines the value of the hyperparameter for the trial of the user program based on the acquired parameter request.

In step S204, the hyperparameter configuration unit 120 returns the determined value of the hyperparameter to the interface unit 110.

In step S205, the interface unit 110 transmits the user program to be trialed and the acquired value of the hyperparameter to the program trial device 200 and instructs the program trial device 200 to trial the user program under the value of the hyperparameter.

In step S206, the program trial device 200 executes the user program under the acquired value of the hyperparameter according to the trial instruction from the interface unit 110. For example, if the user program is a deep learning model, the program trial device 200 trains the deep learning model through multiple epochs executed under the value of the hyperparameter that is set by the hyperparameter configuration unit 120 and outputs the evaluation values such as the accuracy, the execution time, the degree of progress, and the like of the deep learning model trained under the value of the hyperparameter, as an intermediate trial result, for example, after an end of each epoch.

In step S207, the program trial device 200 returns the evaluation result in each epoch as the intermediate trial result to the interface unit 110.

In step S208, the interface unit 110 provides the hyperparameter configuration unit 120 with the acquired intermediate trial result.

In step S209, the hyperparameter configuration unit 120 may evaluate the intermediate trial result (perform the interim evaluation) of each epoch of the user program being executed that is acquired earlier than the normal training completion and may terminate the execution of the user program earlier than normal based on the intermediate trial result. For example, the hyperparameter configuration unit 120 may determine whether to terminate further training of the user program based on an interim evaluation value including one or more intermediate trial results of the accuracy, the execution time, and the degree of progress.

Additionally, the intermediate trial result for the interim evaluation used for the early stopping determination may differ from the trial result for the final result reported to the user. For example, the hyperparameter configuration unit 120 may terminate the execution of further training based on the degree of progress, and the interface unit 110 may report the execution time to the user terminal 50 as the final result.

If it is determined that the user program should be terminated early, in step S210, the hyperparameter configuration unit 120 transmits an early stopping instruction to the program trial device 200 and the interface unit 110 to terminate the execution of the user program. When the number of trials does not reach the specified number in step S211, the value of the hyperparameter that is applied to the next trial is set. Here, the information related to the interim evaluation may be stored in the database 250 as needed.

If it is not determined that the early stopping should be performed, the program trial device 200 continues the execution of the user program and returns to step S207 to provide the interface unit 110 with the intermediate trial result of the next epoch. Subsequently, the flow repeats the above-described process until the condition of the early stopping is not satisfied and the completion condition, such as the completion of a predetermined number of epochs, is satisfied.

In step S211, the hyperparameter configuration unit 120 stores the acquired trial result in the database 250 and sets the value of the hyperparameter applied to the next trial if the number of trials does not reach the specified number.

Subsequently, steps S204 to S211 are repeated until the number of trials reaches the specified number.

If the number of trials reaches the specified number, in step S212, the interface unit 110 provides the user terminal 50 with the trial result that has been acquired as the final result.

Specifically, the hyperparameter configuration device 100 acquires the interim evaluation value by monitoring the standard output of the program trial device 200 during the execution of the user program. Every time the standard output of the program trial device 200 for each epoch is updated, the hyperparameter configuration device 100 performs, for example, a predetermined interim evaluation extraction function to extract the interim evaluation value, such as the accuracy and MSE. Then, the hyperparameter configuration device 100 determines whether the execution of the user program is terminated early based on the acquired interim evaluation value. For example, the extracted interim evaluation value is compared with the interim evaluation values of the trials for the other set values of the hyperparameters, and when the extracted interim evaluation value is less than or equal to the average value, the execution of the user program may be terminated.

With respect to introducing such an early stopping, for example, the following description assumes that there is a machine learning program having 100 values of the hyperparameter, and it takes 10 seconds for each value of the hyperparameter to terminate the machine learning program. Additionally, one interim evaluation value is output every one second. In this case, it takes 100×10 seconds=1000 seconds to evaluate the machine learning program for all 100 values of the hyperparameter. However, with respect to the early stopping, for example, the hyperparameter configuration device 100 may compare an interim evaluation value at the fifth second with interim evaluation values of the other trials, and may terminate the trial if, for example, the interim evaluation value at the fifth second is lower than the average of the interim evaluation values of the other trials. The introduction of early stopping can reduce the time required to optimize the hyperparameter.

Additionally, in one embodiment, the hyperparameter configuration device 100 and the program trial device 200 may be implemented by a single device constituting the program trial system 10. In this case, the program trial system 10 may perform the hyperparameter configuration process according to the flowchart as illustrated in FIG. 6.

Figure 6:
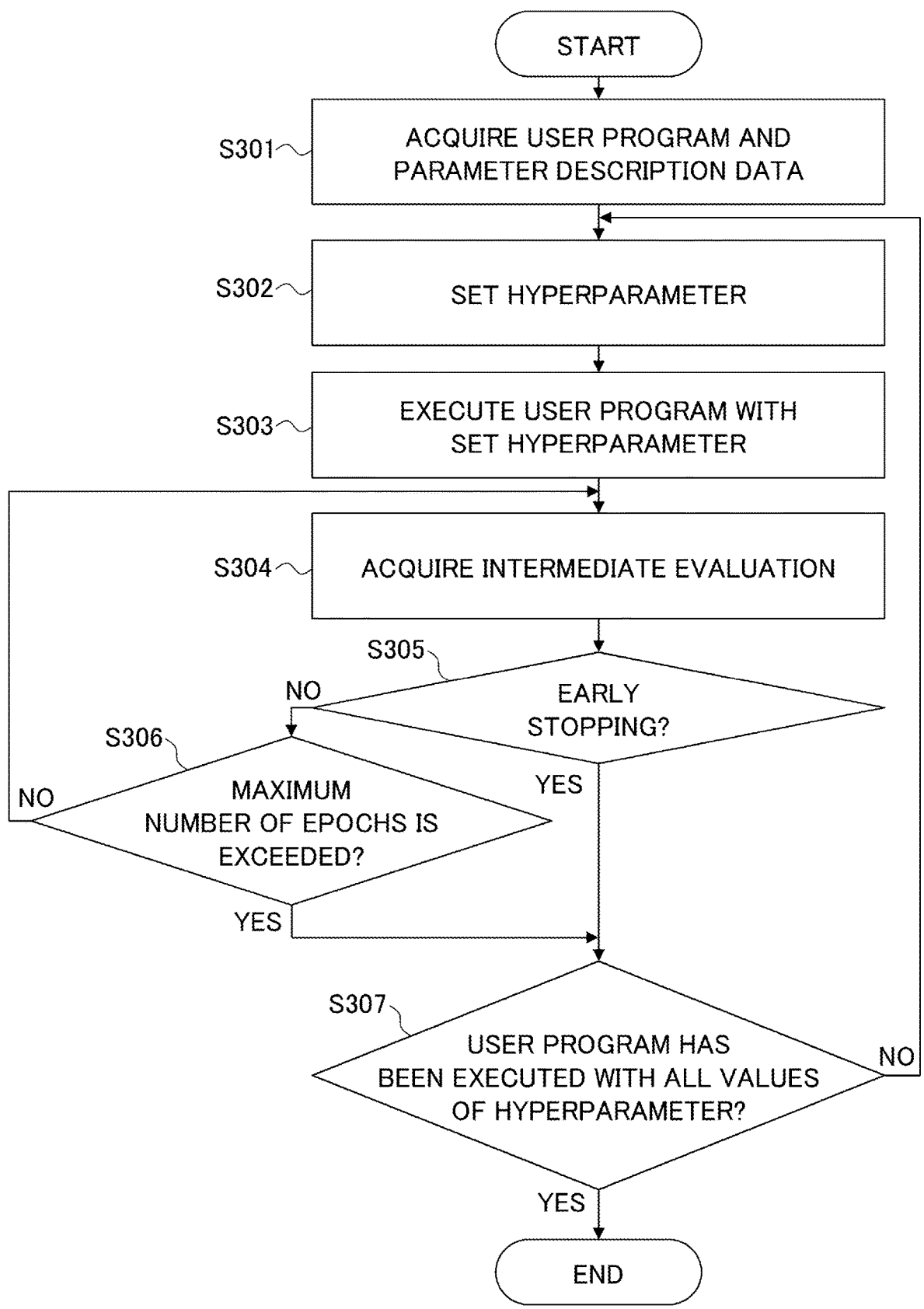
FIG. 6 is a flowchart illustrating the hyperparameter configuration process according to another embodiment of the present disclosure.

As illustrated in FIG. 6, in step S301, the program trial system 10 acquires the user program and the parameter description data from the user terminal 50. That is, the program trial system 10 acquires the user program to be trialed (for example, a deep learning model to be trained or the like) and the parameter description data of the hyperparameter applied to the trial of the user program.

In step S302, the program trial system 10 sets the hyperparameter in accordance with the parameter description data.

In step S303, the program trial system 10 executes the user program with the set hyperparameter. Specifically, the program trial system 10 repeatedly executes the user program an epoch number of times.

In step S304, the program trial system 10 acquires the interim evaluation value for each epoch.

In step S305, the program trial system 10 determines whether to terminate the further repeat of the user program with the value of the hyperparameter set in step S302, based on the acquired interim evaluation value. For example, if the acquired interim evaluation value is less than the average of evaluation values of the other values of the hyperparameter that are already used (S305:YES), the program trial system 10 terminates the further repeat of the user program with the set value of the hyperparameter and proceeds to step S307. With respect to this, if the acquired interim evaluation value is greater than or equal to the average of the evaluation values of the other values of the hyperparameter that are already used (S305:NO), the program trial system 10 proceeds to step S306 without the early stopping of the user program.

In step S306, the program trial system 10 determines whether a predetermined maximum number of epochs has been exceeded. If the maximum number of epochs is not exceeded (S306:NO), the program trial system 10 returns to step S304 and acquires the interim evaluation value of the next epoch performed with the set hyperparameter value. If the maximum number of epochs is exceeded (S306:YES), the program trial system 10 proceeds to step S307.

In step S307, the program trial system 10 determines whether the user program has been executed with all possible values of the hyperparameter. If the user program has already been executed with all possible values of the hyperparameter (S307:YES), the program trial system 10 terminates the hyperparameter configuration process. If the user program has not been executed with all possible values of the hyperparameter (S307:NO), the program trial system 10 sets the next value of the hyperparameter in step S302 and executes the user program repeatedly an epoch number of times with the next set value of the hyperparameter.

Another Embodiment of the Hyperparameter Configuration Device

Next, a hyperparameter configuration device according to another embodiment of the present disclosure will be described with reference to FIG. 7. In the present embodiment, user program trials are distributed.

For example, the interface unit 110 acquires the parameter description data as illustrated in FIG. 7 from the user terminal 50. As can be understood from the illustrated parameter description data, two identical parameter description data are input through the command-line interface on the user terminal 50. When the parameter description data is acquired, the interface unit 110 transmits a parameter request corresponding to the two parameter description data to the hyperparameter configuration unit 120, and the hyperparameter configuration unit 120 sets the value of the hyperparameter for each parameter description data, and returns the parameter description data to the interface unit 110. The interface unit 110 passes the set two values of the hyperparameter to the program trial device 200, and instructs the program trial device 200 to perform trials of the user program in parallel under the respective values of the hyperparameter. Upon completion of the trials performed by the program trial device 200, the interface unit 110 acquires results of the respective trials of the user program obtained by performing the trials in parallel and passes the results to the hyperparameter configuration unit 120. This can terminate the user program trial for a shorter execution time.

Hardware Configuration of the Hyperparameter Configuration Device

In the hyperparameter configuration device 100 in the embodiment, each function may be achieved by an analog circuit, a digital circuit, or a circuit including an analog-digital mixed circuit. Additionally, a control circuit that controls each function may be provided. The implementation of each circuit may be an application specific integrated circuit (ASIC), a field programmable gate array (FPGA), or the like.

In the entire above description, at least a portion of the hyperparameter configuration device may be a hardware component, or may be a software component and may be performed by a central processing unit (CPU) or the like through software information processing. When the software component is used, a program that implements the hyperparameter configuration device or at least one of the functions thereof may be stored in a storage medium and read by a computer to be executed. The storage medium is not limited to a removable medium, such as a magnetic disk (e.g., a flexible disk) or an optical disk (e.g., a CD-ROM or a DVD-ROM), but may be a fixed storage medium such as a hard disk device or a solid state drive (SSD) using a memory. That is, the software information processing may be concretely implemented using hardware resources. Additionally, the software processing may be implemented in a circuit, such as an FPGA, and may be executed by a hardware component. The execution of the job may be performed using an accelerator such as a graphics processing unit (GPU), for example.

For example, by reading the dedicated software stored in a computer-readable storage medium, a computer may function as a device of the above-described embodiment. The type of the storage medium is not particularly limited. Additionally, by installing the dedicated software downloaded through a communication network in a computer, a computer may function as a device according to the above-described embodiment. In this way, software information processing is concretely implemented using hardware resources.

Figure 8:
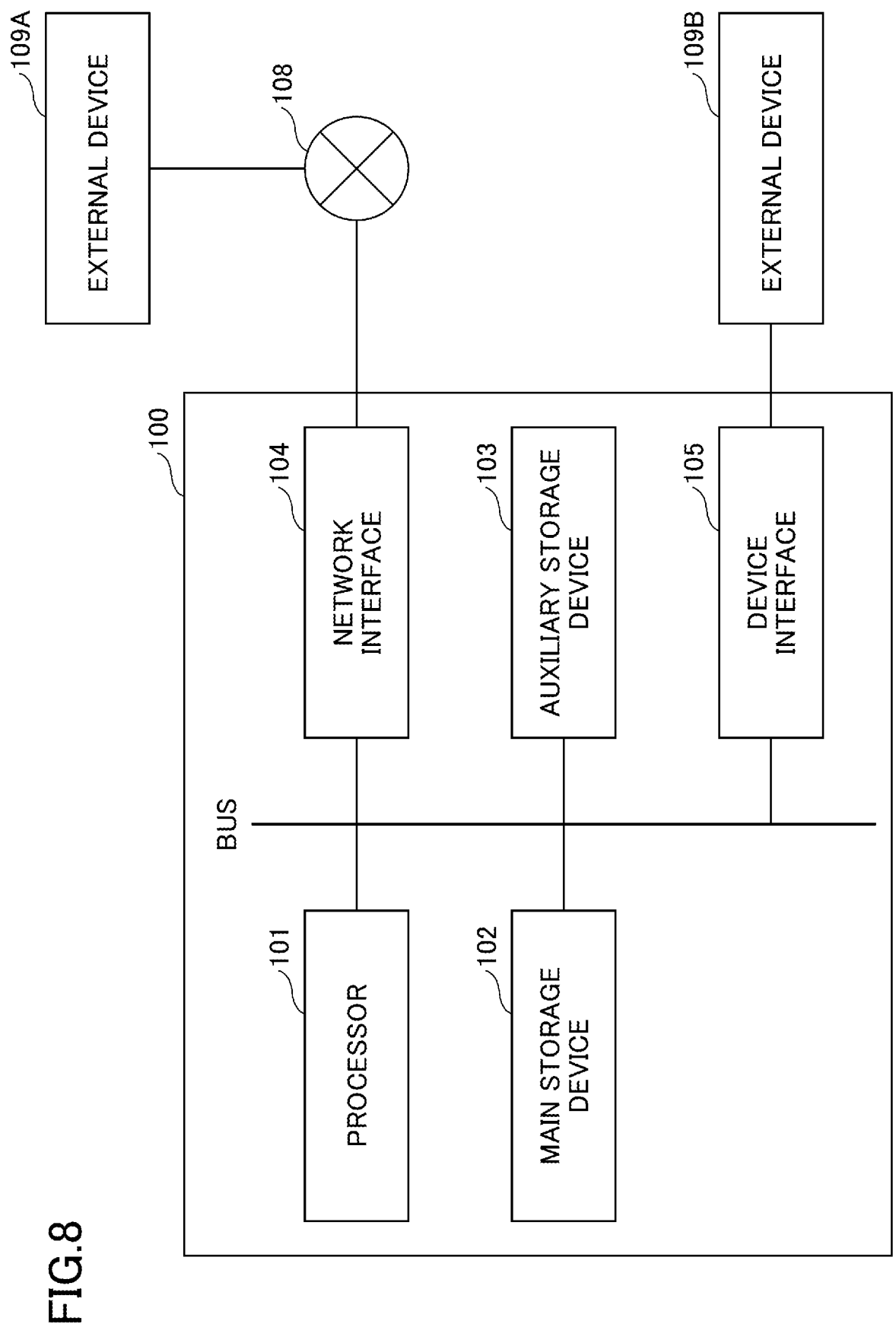
FIG. 8 is a block diagram illustrating a hardware configuration of the hyperparameter configuration device according to the embodiment of the present disclosure.

FIG. 8 is a block diagram illustrating an example of a hardware configuration in the embodiment of the present disclosure. The hyperparameter configuration device 100 includes a processor 101, a main storage device 102, an auxiliary storage device 103, a network interface 104, and a device interface 105, and these components are connected through a bus 106 to be implemented as a computer device.

Here, the hyperparameter configuration device 100 illustrated in FIG. 8 includes one component each, but may include multiple identical components. Additionally, although a single hyperparameter configuration device 100 is illustrated, the software may be installed in multiple computer devices and the respective multiple hyperparameter configuration devices 100 may perform different parts of the processing of the software. In this case, the respective multiple hyperparameter configuration devices 100 may communicate through the network interface 104 or the like.

The processor 101 is an electronic circuit (a processing circuit and processing circuitry) including a controller and an arithmetic device of the hyperparameter configuration device 100. The processor 101 performs arithmetic processing based on data and a program input from each device of the internal configuration of the hyperparameter configuration device 100 or the like and outputs an arithmetic result or a control signal to each device or the like. Specifically, the processor 101 controls the components constituting the hyperparameter configuration device 100 by executing an operating system (OS), an application, and the like of the hyperparameter configuration device 100. The processor 101 is not particularly limited as long as the above-described process can be performed. The hyperparameter configuration device 100 and respective components thereof may be achieved by the processor 101. Here, the processing circuit may refer to one or more electrical circuits disposed on one chip, or may refer to one or more electrical circuits disposed on two or more chips or devices. When multiple electronic circuits are used, each electronic circuit may communicate by wire or wirelessly.

The main storage device 102 is a storage device that stores instructions executed by the processor 101, various data, and the like, and information stored in the main storage device 102 is directly read by the processor 101. The auxiliary storage device 103 is a storage device other than the main storage device 102. Here, these storage devices indicate any electronic component that can store electronic information, and may be either a memory or a storage. Additionally, the memory may be either a volatile memory or a non-volatile memory. A memory that stores various data in the hyperparameter configuration device 100, that is, for example, the memory may be implemented by the main storage device 102 or the auxiliary storage device 103. For example, at least a part of the memory may be implemented in the main storage device 102 or the auxiliary storage device 103. As another example, if an accelerator is provided, at least a part of the memory described above may be implemented in a memory provided in the accelerator.

The network interface 104 is an interface for connecting to the communication network 108 wirelessly or by wire. The network interface 104 may be compliant with existing communication standards. By using the network interface 104, information may be exchanged with the external device 109A communicably connected through the communication network 108.

The external device 109A may include, for example, a camera, a motion capture device, an output destination device, an external sensor, an input source device, and the like. Additionally, the external device 109A may be a device having a function of a portion of a component of the hyperparameter configuration device 100. The hyperparameter configuration device 100 may receive a portion of the processing results of the hyperparameter configuration device 100 through the communication network 108, such as a cloud service.

The device interface 105 is an interface such as a universal serial bus (USB) that directly connects to the external device 109B. The external device 109B may be either an external storage medium or a storage device. The memory may be implemented by the external device 109B.

The external device 109B may be an output device. The output device may be, for example, a display device that displays an image, a device that outputs an audio or the like, or the like. Examples of the output device may include a liquid crystal display (LCD), a cathode ray tube (CRT), a plasma display panel (PDP), an organic electro luminescence (EL) display, a speaker, and the like, but are not limited to these.

Here, the external device 109B may be an input device. The input device includes a device such as a keyboard, a mouse, a touch panel, a microphone, and the like to provide information input by these devices to the hyperparameter configuration device 100. Signals from the input device are output to the processor 101.

For example, the interface unit 110, the hyperparameter configuration unit 120, and the like of the hyperparameter configuration device 100 according to the present embodiment may be implemented by the processor 101. Additionally, the memory of the hyperparameter configuration device 100 may be implemented by the main storage device 102 or the auxiliary storage device 103. The hyperparameter configuration device 100 may also include one or more memories.

In the present specification, "at least one of a, b, and c" is an expression that includes a combination with multiple identical elements, such as a-a, a-b-b, a-a-b-b-c-c, in addition to a combination of a, b, c, a-b, a-c, b-c, a-b-c. Further, the expression covers a configuration including an element other than a, b and c, such as a combination of a-b-c-d.

Similarly, in the present specification, "at least one of a, b, or c" is an expression that includes a combination with multiple identical elements, such as a-a, a-b-b, a-a-b-b-c-c, in addition to a combination of a, b, c, a-b, a-c, b-c, a-b-c. Further, the expression covers a configuration including an element other than a, b and c, such as a combination of a-b-c-d.

Although the embodiments of the present disclosure have been described in detail above, the present disclosure is not limited to the specific embodiments described above, and various modifications and alterations can be made within the scope of the subject matter of the present disclosure as recited in the claims.

The present application is based on and claims priority to Japanese Patent Application No. 2019-109537, filed on Jun. 12, 2019, the entire contents of which are incorporated herein by reference.

What is claimed is:

1. A hyperparameter configuration device comprising:
at least one memory; and
at least one processor configured to:
    acquire a program execution instruction written through a command-line interface, the program execution instruction including a name of a program to be trialed and parameter description data;
    set a value of a hyperparameter of the program, based on the parameter description data;
    acquire a result of a trial of the program, the trial of the program being executed with the value of the hyperparameter; and
    set a next value of the hyperparameter of the program, based on the result of the trial,
wherein a behavior of a machine learning algorithm is controlled using the next value of the hyperparameter,
wherein the parameter description data is written through the command-line interface,
wherein the parameter description data includes a name of the hyperparameter, a distribution identifier of the hyperparameter, and a range specification value of the hyperparameter, wherein the at least one processor sets the value of the hyperparameter based on the distribution identifier and the range specification value included in the parameter description data, wherein the distribution identifier includes information of at least one of a type of a target to be selected as the value of the hyperparameter or a distribution of the target to be selected as the value of the hyperparameter, and wherein the parameter description data is not written within the program.

2. The hyperparameter configuration device as claimed in claim 1, wherein the parameter description data includes information related to a second hyperparameter that is set depending on a value of a first hyperparameter, and wherein the at least one processor sets a value of the second hyperparameter based on the value of the first hyperparameter.

3. The hyperparameter configuration device as claimed in claim 1, wherein the at least one processor terminates the trial of the program, before a specified number of iterations are finished, based on an intermediate result of the trial of the program.

4. The hyperparameter configuration device as claimed in claim 1, wherein the program execution instruction includes first parameter description data and second parameter description data, the first parameter description data being written through the command-line interface, and the second parameter description data being written through the command-line interface, wherein the at least one processor sets a first value of the hyperparameter and a second value of the hyperparameter, the first value of the hyperparameter being based on the first parameter description data, and the second value of the hyperparameter being based on the second parameter description data, wherein the at least one processor acquires a result of a first trial of the program and a result of a second trial of the program, the first trial being executed with the first value of the hyperparameter, and the second trial being executed with the second value of the hyperparameter, and wherein the at least one processor sets a next value of the hyperparameter of the program, based on the result of the first trial and the result of the second trial.

5. The hyperparameter configuration device as claimed in claim 4, wherein the execution of the first trial with the first value of the hyperparameter and the execution of the second trial with the second value of the hyperparameter are performed in parallel.

6. The hyperparameter configuration device as claimed in claim 4, wherein the program execution instruction includes identification information of the first trial, identification information of the second trial, information related to a storage area to be used to store the result of the first trial, and information related to a storage area to be used to store the result of the second trial, and wherein the identification information of the first trial is identical to the identification information of the second trial, and the information related to the storage area to be used to store the result of the first trial is identical to the information related to the storage area to be used to store the result of the second trial.

7. The hyperparameter configuration device as claimed in claim 1, wherein the trial of the program is executed by another device.

8. A program trial system comprising the hyperparameter configuration device as claimed in claim 1, wherein the at least one processor executes the program with the value of the hyperparameter.

9. An interface device comprising:
at least one memory; and
at least one processor configured to:
acquire a program execution instruction written through a command-line interface, the program execution instruction including a name of a program to be trialed and parameter description data;
generate parameter data in a data format that can be processed by at least one hyperparameter processor, based on the parameter description data, the at least one hyperparameter processor being configured to determine a value of a hyperparameter of the program;
acquire the value of the hyperparameter of the program, the value of the hyperparameter being determined by the at least one hyperparameter processor;
acquire a result of a trial of the program, the trial being executed with the value of the hyperparameter; and
acquire a next value of the hyperparameter of the program, the next value being determined by the at least one hyperparameter processor based on the result of the trial, wherein a behavior of a machine learning algorithm is controlled using the next value of the hyperparameter, wherein the parameter description data is written through the command-line interface, wherein the at least one processor generates the parameter data in the data format, based on a name of the hyperparameter, a distribution identifier of the hyperparameter, and a range specification value of the hyperparameter included in the parameter description data, wherein the distribution identifier includes information of at least one of a type of a target to be selected as the value of the hyperparameter or a distribution of the target to be selected as the value of the hyperparameter, and wherein the parameter description data is not written within the program.

10. The interface device as claimed in claim 9, wherein the at least one processor generates the parameter data in the data format, based on a correspondence table retained in advance.

11. The interface device as claimed in claim 9, wherein the at least one hyperparameter processor is the at least one processor.

12. A hyperparameter configuration method comprising:
acquiring, by at least one processor, a program execution instruction written through a command-line interface, the program execution instruction including a name of a program to be trialed and parameter description data;
setting, by the at least one processor, a value of a hyperparameter of the program, based on the parameter description data;
acquiring, by the at least one processor, a result of a trial of the program, the trial of the program being executed with the value of the hyperparameter; and
setting, by the at least one processor, a next value of the hyperparameter of the program, based on the result of the trial, wherein a behavior of a machine learning algorithm is controlled using the next value of the hyperparameter, wherein the parameter description data is written through the command-line interface, wherein the parameter description data includes a name of the hyperparameter, a distribution identifier of the hyperparameter, and a range specification value of the hyperparameter, wherein the setting of the value of the hyperparameter includes setting the value of the hyperparameter based on the distribution identifier and the range specification value included in the parameter description data, wherein the distribution identifier includes information of at least one of a type of a target to be selected as the value of the hyperparameter or a distribution of the target to be selected as the value of the hyperparameter, and wherein the parameter description data is not written within the program.

13. The hyperparameter configuration method as claimed in claim 12, wherein the parameter description data includes information related to a second hyperparameter that is set depending on a value of a first hyperparameter, and wherein the setting of the value of the hyperparameter includes setting a value of the second hyperparameter based on the value of the first hyperparameter.

14. The hyperparameter configuration method as claimed in claim 12, further comprising terminating, by the at least one processor, the trial of the program, before a specified number of iterations are finished, based on an intermediate result of the trial of the program.

15. The hyperparameter configuration method as claimed in claim 12, wherein the program execution instruction includes first parameter description data and second parameter description data, the first parameter description data being written through the command-line interface, and the second parameter description data being written through the command-line interface, wherein the setting of the value of the hyperparameter includes setting a first value of the hyperparameter and a second value of the hyperparameter, the first value of the hyperparameter being based on the first parameter description data, and the second value of the hyperparameter being based on the second parameter description data, wherein the acquiring of the result of the trial includes acquiring a result of a first trial of the program and a result of a second trial of the program, the first trial being executed with the first value of the hyperparameter, and the second trial being executed with the second value of the hyperparameter, and wherein the setting of the next value of the hyperparameter includes setting a next value of the hyperparameter of the program, based on the result of the first trial and the result of the second trial.

16. The hyperparameter configuration method as claimed in claim 15, wherein the execution of the first trial with the first value of the hyperparameter and the execution of the second trial with the second value of the hyperparameter are performed in parallel.

17. The hyperparameter configuration method as claimed in claim 15, wherein the program execution instruction includes identification information of the first trial, identification information of the second trial, information related to a storage area to be used to store the result of the first trial, and information related to a storage area to be used to store the result of the second trial, and wherein the identification information of the first trial is identical to the identification information of the second trial, and the information related to the storage area to be used to store the result of the first trial is identical to the information related to the storage area to be used to store the result of the second trial.

18. The hyperparameter configuration method as claimed in claim 12, wherein the program includes a machine learning model, wherein the hyperparameter includes at least one of a learning rate, a batch size, a number of learning iterations, a number of layers of a neural network, or a number of channels of the neural network, and wherein the result of the trial includes information related to at least one of accuracy of the machine learning model, execution time, or a degree of progress.

19. An interface method comprising:

acquiring, by at least one processor, a program execution instruction written through a command-line interface, the program execution instruction including a name of a program to be trialed and parameter description data;

generating, by the at least one processor, parameter data in a data format that can be processed by at least one hyperparameter processor, based on the parameter description data, the at least one hyperparameter processor being configured to determine a value of a hyperparameter of the program;

acquiring, by the at least one processor, the value of the hyperparameter of the program, the value of the hyperparameter being determined by the at least one hyperparameter processor;

acquiring, by the at least one processor, a result of a trial of the program, the trial being executed with the value of the hyperparameter; and acquiring, by the at least one processor, a next value of the hyperparameter of the program, the next value being determined by the at least one hyperparameter processor based on the result of the trial, wherein a behavior of a machine learning algorithm is controlled using the next value of the hyperparameter, wherein the parameter description data is written through the command-line interface, wherein the generating of the parameter data includes generating the parameter data in the data format, based on a name of the hyperparameter, a distribution identifier of the hyperparameter, and a range specification value of the hyperparameter included in the parameter description data, wherein the distribution identifier includes information of at least one of a type of a target to be selected as the value of the hyperparameter or a distribution of the target to be selected as the value of the hyperparameter, and wherein the parameter description data is not written within the program.

20. The interface method as claimed in claim 19, wherein the generating of the parameter data includes generating the parameter data in the data format, based on a correspondence table retained in advance.

21. The interface method as claimed in claim 19, wherein the at least one hyperparameter processor is the at least one processor.

22. A non-transitory computer-readable recording medium having stored therein a hyperparameter configuration program for causing at least one processor to execute a process comprising:
- acquiring a program execution instruction written through a command-line interface, the program execution instruction including a name of a program to be trialed and parameter description data;
- setting a value of a hyperparameter of the program, based on the parameter description data;
- acquiring a result of a trial of the program, the trial of the program being executed with the value of the hyperparameter; and
- setting a next value of the hyperparameter of the program, based on the result of the trial,
- wherein a behavior of a machine learning algorithm is controlled using the next value of the hyperparameter,
- wherein the parameter description data is written through the command-line interface,
- wherein the parameter description data includes a name of the hyperparameter, a distribution identifier of the hyperparameter, and a range specification value of the hyperparameter,
- wherein the at least one processor sets the value of the hyperparameter based on the distribution identifier and the range specification value included in the parameter description data,
- wherein the distribution identifier includes information of at least one of a type of a target to be selected as the value of the hyperparameter or a distribution of the target to be selected as the value of the hyperparameter, and
- wherein the parameter description data is not written within the program.

23. A non-transitory computer-readable recording medium having stored therein an interface program for causing at least one processor to execute a process comprising:
- acquiring a program execution instruction written through a command-line interface, the program execution instruction including a name of a program to be trialed and parameter description data;
- generating parameter data in a data format that can be processed by at least one hyperparameter processor, based on the parameter description data, the at least one hyperparameter processor being configured to determine a value of a hyperparameter of the program;
- acquiring, the value of the hyperparameter of the program, the value of the hyperparameter being determined by the at least one hyperparameter processor;
- acquiring a result of a trial of the program, the trial being executed with the value of the hyperparameter; and
- acquiring, a next value of the hyperparameter of the program, the next value being determined by the at least one hyperparameter processor based on the result of the trial,
- wherein a behavior of a machine learning algorithm is controlled using the next value of the hyperparameter,
- wherein the parameter description data is written through the command-line interface,
- wherein the at least one processor generates the parameter data in the data format, based on a name of the hyperparameter, a distribution identifier of the hyperparameter, and a range specification value of the hyperparameter included in the parameter description data,
- wherein the distribution identifier includes information of at least one of a type of a target to be selected as the value of the hyperparameter or a distribution of the target to be selected as the value of the hyperparameter, and
- wherein the parameter description data is not written within the program.

24. The non-transitory computer-readable recording medium as claimed in claim 23, wherein the at least one hyperparameter processor is the at least one processor.

25. The hyperparameter configuration device as claimed in claim 1, wherein the at least one processor is configured to control the machine learning algorithm by using the next value of the hyperparameter.

26. The hyperparameter configuration device as claimed in claim 1,
- wherein the at least one processor is configured to transmit the next value of the hyperparameter to another device, and
- wherein the machine learning algorithm is controlled using the next value of the hyperparameter by the another device.

27. The hyperparameter configuration device as claimed in claim 25, wherein the at least one processor is configured to train a machine learning model using the next value of the hyperparameter.

28. The hyperparameter configuration device as claimed in claim 26, wherein a machine learning model is trained using the next value of the hyperparameter by the another device.

* * * * *